Aug. 7, 1934.  A. G. WITTBERGER  1,969,285
DRIVE GEARING FOR SHOVEL CRANES
Filed Jan. 29, 1931   5 Sheets-Sheet 1

Inventor
ANTON G. WITTBERGER.
By
Attorneys

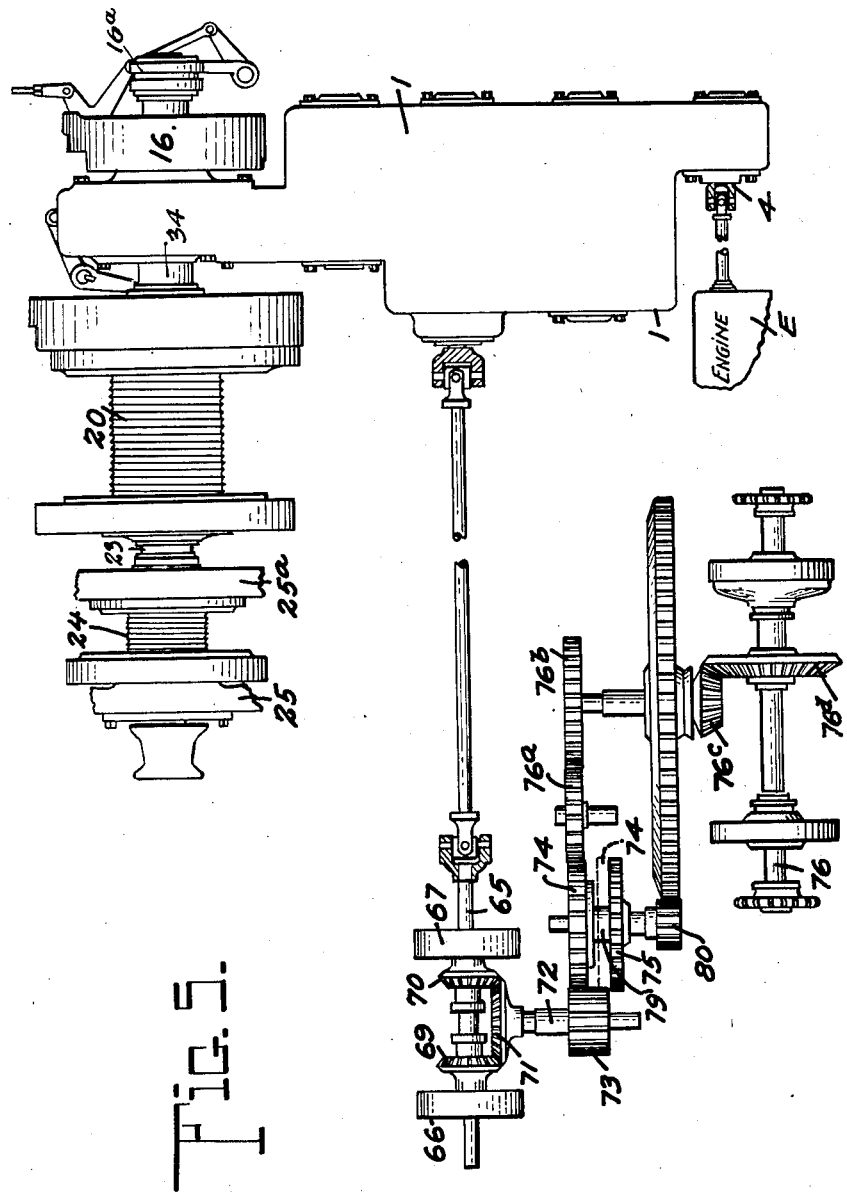

Patented Aug. 7, 1934

1,969,285

UNITED STATES PATENT OFFICE 1,969,285

DRIVE GEARING FOR SHOVEL CRANES

Anton G. Wittberger, Milwaukee, Wis., assignor to Koehring Company, Milwaukee, Wis., a corporation Application January 29, 1931, Serial No. 512,155

11 Claims. (Cl. 214—132)

This invention relates to drive gearing for shovel cranes of the convertible type and it is especially applicable to excavating machines of the type disclosed in the patent to Holcomb, No. 1,506,906, and the patents to Russell, Nos. 1,676,353 and 1,700,181.

More particularly, my invention contemplates the use of operating gearing which is mounted in a unitary casing whereby to be entirely closed and capable of a continuous bath of oil, as disclosed in the copending application, Serial No. 490,055, in which the speed change or gear ratio is easily accomplished.

An object of this invention is to provide a new type of transmission gearing for shovel and dragline excavators, cranes, and the like, whereby the gearing mechanism may be adjusted so as to provide an independent drive to the excavating machinery on the carbody of the machine, as well as an independent drive to the traction devices of the machine.

Another object is to provide independent variable drives to the excavating machinery, the traction devices and the means for swinging or rotating the carbody.

In the above referred to co-pending application, it was not possible to provide a variation in the speed of the drive between the excavating machinery such as the hoisting drums and the traction devices or the swing mechanism, as is possible in the present application and which forms an important phase thereof.

In excavating machines of the type mentioned, it is sometimes necessary in moving the machine from one project to another to travel comparatively long distances and under these conditions the arrangement of my invention is very efficient, since the drive to the excavating mechanism is rendered entirely stationary and in this manner the normal life of these parts is materially increased over what would be the case if the hoisting drums, shafts and intermediate gearing, or any of these parts, were at all times revolving.

In this construction, the traction drive and the carbody swing mechanisms are both driven from a set of change speed gears which is separate from the gears which operate the hoisting drums or excavating machinery of the crane. This is highly desirable and advantageous for certain classes of work, since when the excavator is using the shovel attachment and digging in hard material, the above construction permits a high speed drive to the traction and swing mechanism of the machine while at the same time allowing the cable drums to operate at the relatively low speed necessary for efficient operation in this kind of material. The construction also offers advantages when the device is being operated with the clam shell attachment, for instance, and digging in comparatively soft material, since under these conditions it is possible to operate the cable drums so as to give the cables a comparatively high rate of speed while at the same time provide a comparatively slow swing speed for the carbody, this being desirable since it permits efficient operation of the excavator without the undesirable whipping of the bucket in swinging to spot the load which would be the case if under the just pointed out conditions, the cable line speed and the swing speed were the same.

It is likewise possible with the present construction to establish a high or low speed drive to the hoisting drums for excavating or crane purposes while at the same time maintain the swing and traction shaft which extends out of the enclosed gear casing, stationary, and this arrangement materially reduces wear and tear on the mechanisms under some conditions of work where the excavator crane is operating from a substantially fixed position.

Other and further objects and advantages of the invention will be hereinafter set forth and the novel features thereof defined by the appended claims.

In the drawings:

Fig. 2A is a continuation of Fig. 2 taken approximately on the line 2A—2A of Fig. 1;

Fig. 5 is a diagrammatic view in elevation of the gear casing and its relation to the front drum assembly and the swing and traction driving mechanism; and Fig. 6 is a diagrammatic view of a convertible machine constructed in accordance with my invention.

Like reference characters refer to like parts in the several figures of the drawings.

Figure 1:
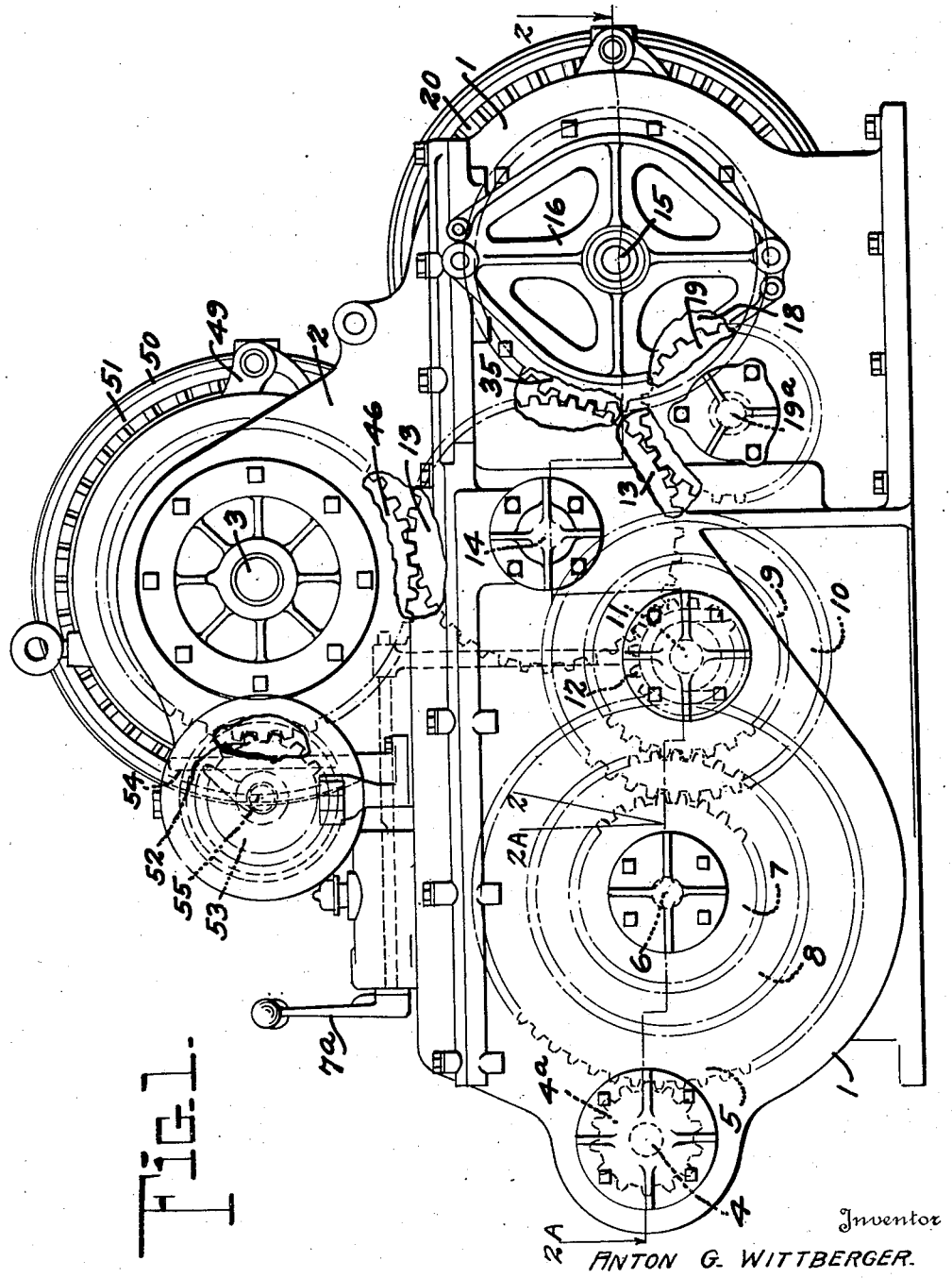
Fig. 1 is a side view of my improved type of excavating machine operating gearing and casing, parts being shown broken away to disclose certain of the gears in elevation.

Referring to Fig. 6, B represents the traction base upon which is rotatably mounted the carbody A carrying the excavating machinery for operating the various parts of the excavator. Suitably secured to one end of the carbody A is the particular excavating attachment which it is desired to use, and which, as shown in this view, comprises a boom and shovel, indicated generally at C, although this particular attachment may be removed and other attachments added, such as the clam shell attachment, crane boom, drag-line or pile driver, as disclosed in the patented applications of Holcomb and Russell.

Mounted upon the platform of the carbody A is a unitary gear casing which is indicated generally in the drawings by the reference numeral 1. This casing is provided with a cover 2 adapted to support the right hand end of the rear drum shaft 3.

Figure 2:
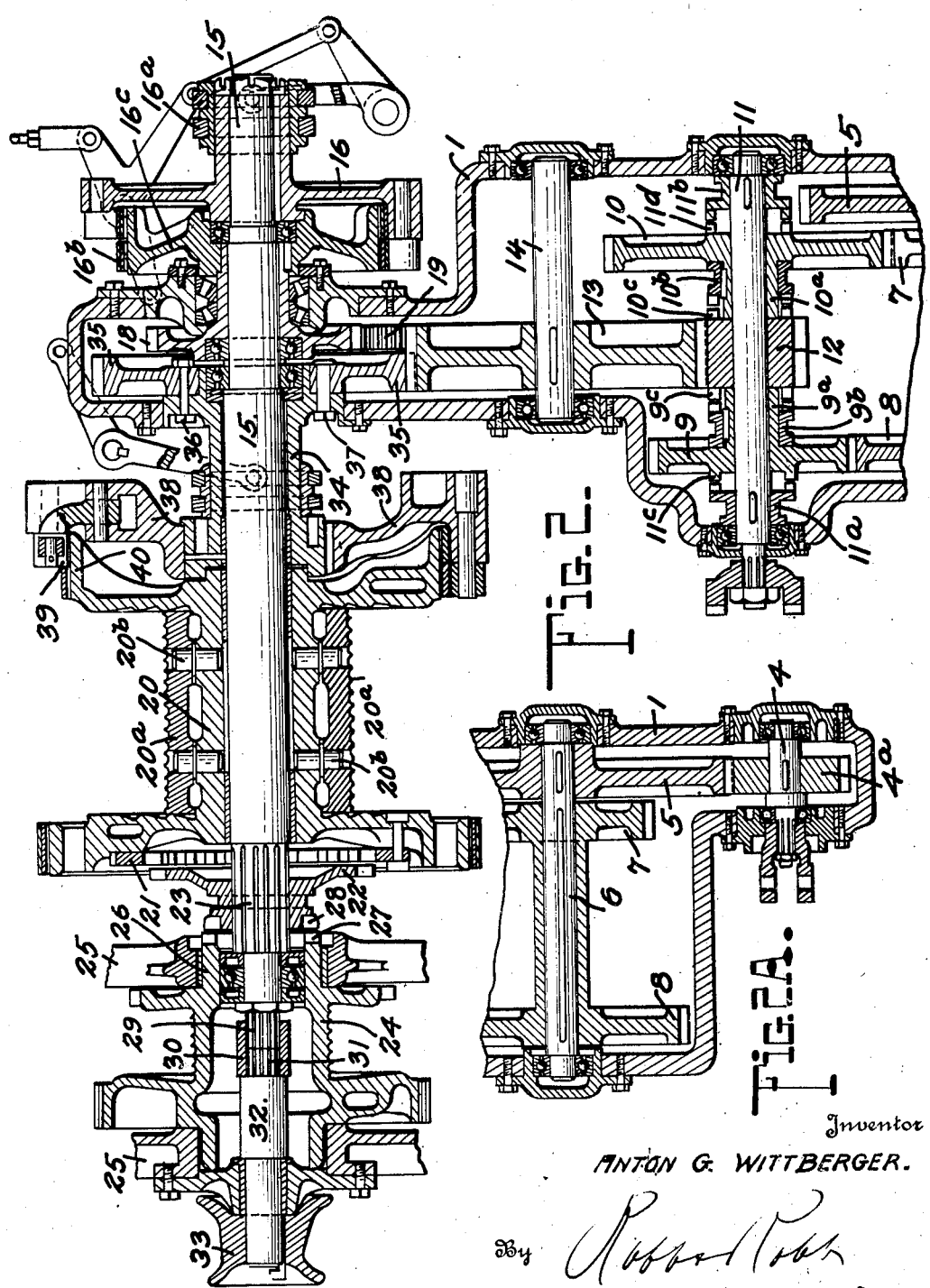
Fig. 2 is a substantially horizontal sectional view taken through the gear casing approximately on the line 2—2 of Fig. 1.
Figure 3:
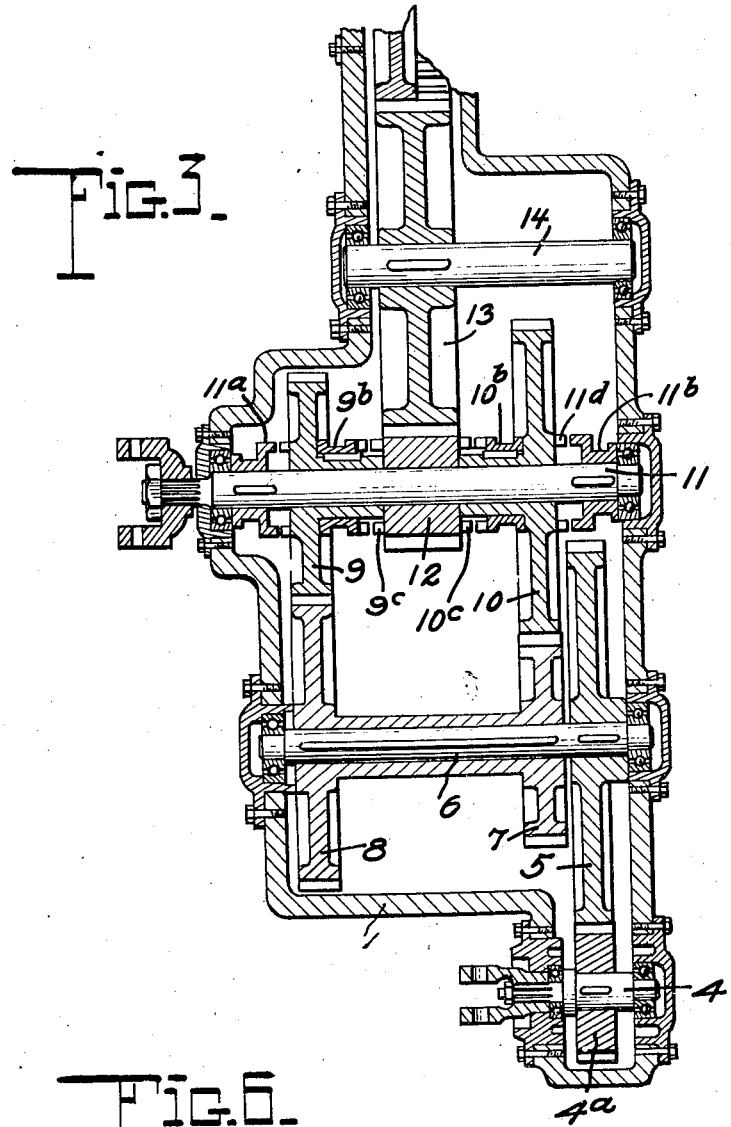
Fig. 3 is a sectional view of the lower portion of Figs. 2 and 2A when assembled and disclosing the gear driving relation between the drive shaft and the power take-off shaft to the swing and traction operating mechanism.

Located at one end of the casing 1 is the drive shaft 4, as seen in Figs. 1, 2A and 3, which is suitably driven from the engine E, as disclosed in Fig. 5. The drive shaft 4 carries keyed thereto a gear 4a which meshes with a large driving gear 5 on the high and low speed driving shaft 6 on which is fixed in spaced relation the two driving gears 7 and 8, the gear 7 constituting the low speed driving gear while the gear 8 is the high speed driving gear.

Suitably journaled in the casing 1 in spaced relation to the shaft 6 is a second shaft 11, hereinafter called the swing and traction shaft since this shaft is used for the purpose of operating the traction members of the crane and for swinging the carbody around its pivotal center on the traction base. The shaft 11 has loosely journaled thereon the spaced gears 9 and 10 which are constantly in mesh with the aforementioned gears 7 and 8. Loosely disposed on the swing and traction shaft 11 intermediate the gears 9 and 10 is a third gear 12 which constitutes the driving gear for the excavating machinery on the carbody, as will be later explained.

With reference to Fig. 2, it will be observed that the gears 9 and 10 are each provided with a splined extremity 9a and 10a on which a clutch element 9b and 10b is slidably mounted. These clutch elements are designed to engage corresponding clutch faces 9c and 10c on the gear 12 when either one of the said clutch elements is moved toward the gear and thereby establish a high or low driving relation between either of the gears 9 or 10 and the gear 12.

The swing and traction shaft 11 is also provided with a pair of clutches 11a and 11b splined thereon and slidable to engage either of the clutch faces 11c or 11d on the gears 9 and 10. When either of these clutches 11a or 11b is moved into clutching engagement with the clutch face 11c or 11d, driving relation is established between one of the gears 9 and 10, and the shaft 11 thereby establishes a high or low drive to either the carbody swing mechanism or the traction devices for the carbody.

The pinion 12 on the swing and traction shaft 11 is in constant meshing relation with the gear 13 keyed to the idler shaft 14. The use of this idler shaft and pinion is very important since it permits the use of a comparatively small and condensed set of gears.

The front drum shaft assembly, as disclosed in Figs. 2 and 5, comprises a front drum shaft 15 to which is keyed the clutch band carrier 16. Clutching engagement between the parts of the carrier 16 and the clutch drum 16c may be accomplished when desired by shifting the clutch shifter 16a and this causes the bands 16b to clamp the clutch drum 16c and thereby establish driving relation between the drum 16c and the shaft 15. In order to establish a driving relation between the sleeved pinion 18 and the pinion 13 on the idler shaft, a reversing pinion 19 is provided which is constantly in mesh with the pinions just referred to. The front cable drum 20 is rotatable on the front drum shaft 15 and is provided with an internal jaw clutch 21 adapted to receive the clutch element 22 which is splined to the shaft 15, at 23. The movement of this clutch element 22 into engagement with the internal jaw clutch 21 transmits power from the shaft 15 to the drum 20 so that rotation of the shaft 15 will cause corresponding rotation of the drum 20.

The hoisting cable drum 24 is rotatably carried on the frame members 25 and 25a of the machine and is provided with a sleeved extension 26 forming a bearing for one end of the drum 24. This extension is provided at its extremity with a jaw clutch face 27 and is adapted to receive the clutch member 28 of the splined clutch member 22 when the same is moved to the left. Under these conditions, a driving relation is established between the shaft 15 and the boom hoist drum 24. When the clutch and gear elements 16 and 18 are engaged, rotation of the shaft and drum 24 for raising the boom is accomplished.

The shaft 15 is splined at 29 to receive the splined coupling 30, which is in turn engaged by the splined end 31 of the winch shaft 32. The shaft 32 is suitably journaled in the frame and carries on the other end thereof the winch head 33 which provides an auxiliary power device and is always available for use when the clutch elements 16 and 16c are engaged. The sleeve member 34 is freely rotatable on the shaft 15 and carries at one end thereof a driving pinion 35 which meshes with the pinion 13 on the idler shaft 14. This pinion 35 is secured to the sleeve member 34 by bolts 36 and driving pins 37. Keyed to the other end of the sleeve member 34 is the clutch spider 38 having a band clutch 39 arranged to engage the friction drum surface 40 forming part of the front drum 20.

From the above it will be observed that the driving relation between the pinion 13 on the idler shaft 14 and the drum 20 may also be established by engagement of the clutch band 39 with the clutch band surface 40 carried by the drum, and since a reverse pinion 19 is interposed between the pinions 18 and 13, rotation of the drum 20 in a counterclockwise direction, or direction opposite from that caused by the engagement of the clutch members 16 and 16c will be accomplished when the clutch member 39 is engaged. The drum 20, as seen in Figs. 2 and 5, is provided with suitable removable lagging 20a driven by the drum by driving lugs 20b.

The rear drum of the excavator is not shown in the drawings, but this drum is carried by the shaft 3 and constitutes a holding or closing line for the machine when a clam shell bucket is being used, and the drum is also used for raising and lowering of the dipper when the machine is used as a shovel, as seen in the small diagrammatic Fig. 6. The drum is freely rotatable on the rear drum shaft 3 and in all respects is similar to the drum 20 on the front drum shaft 15.

The shaft 3 is suitably carried by the cover 2 for the gear housing 1 and carries thereon a sleeve (not shown) to which is secured the pinion 46 meshing with the pinion 13, as seen in Fig. 1 of the drawings. The other end of the sleeve carries the clutch band spider 49 which engages the clutch band 50 to move the same into engagement with the clutch drum friction surface 51 forming a part of the rear drum. Engagement of the band 50 with the drum 51 provides a drive connection between the pinion 46 and the main rear drum, and since the pinion 46 is adapted to be driven at different speeds, depending upon which of the clutches 9b or 10b is engaged, it will be observed that the rear drum, as well as the front drum, is adapted to be driven at different speeds.

Referring again to Fig. 1 of the drawings, it will be observed that the cover 2 is provided with an opening 52 adapted to receive the pinion 53 of a combined tag-line and dipper trip cable reeving device, which device is carried by a cover plate 54 suitably and removably secured to the cover 2. The cover plate 54 carries journaled therein the shaft 55 on which the aforementioned pinion 53 is keyed. One end of this shaft projects beyond the side of the cover and carries freely rotatable thereon a combined clam shell tag-line and shovel trip cable drum 56 around which is wound the tag-line and dipper trip cable 57. A clutch is provided to establish a variable drive relation between the shaft and the drum and is normally operable to rotate the drum to take up slack in the dipper tripping line when the shovel attachment is used. The clutch may be manually adjusted so as to provide the additional tension on the line for dipper tripping purposes and also may be adjusted to provide tension on the tag-line when the clam shell attachment is used.

Figure 4:
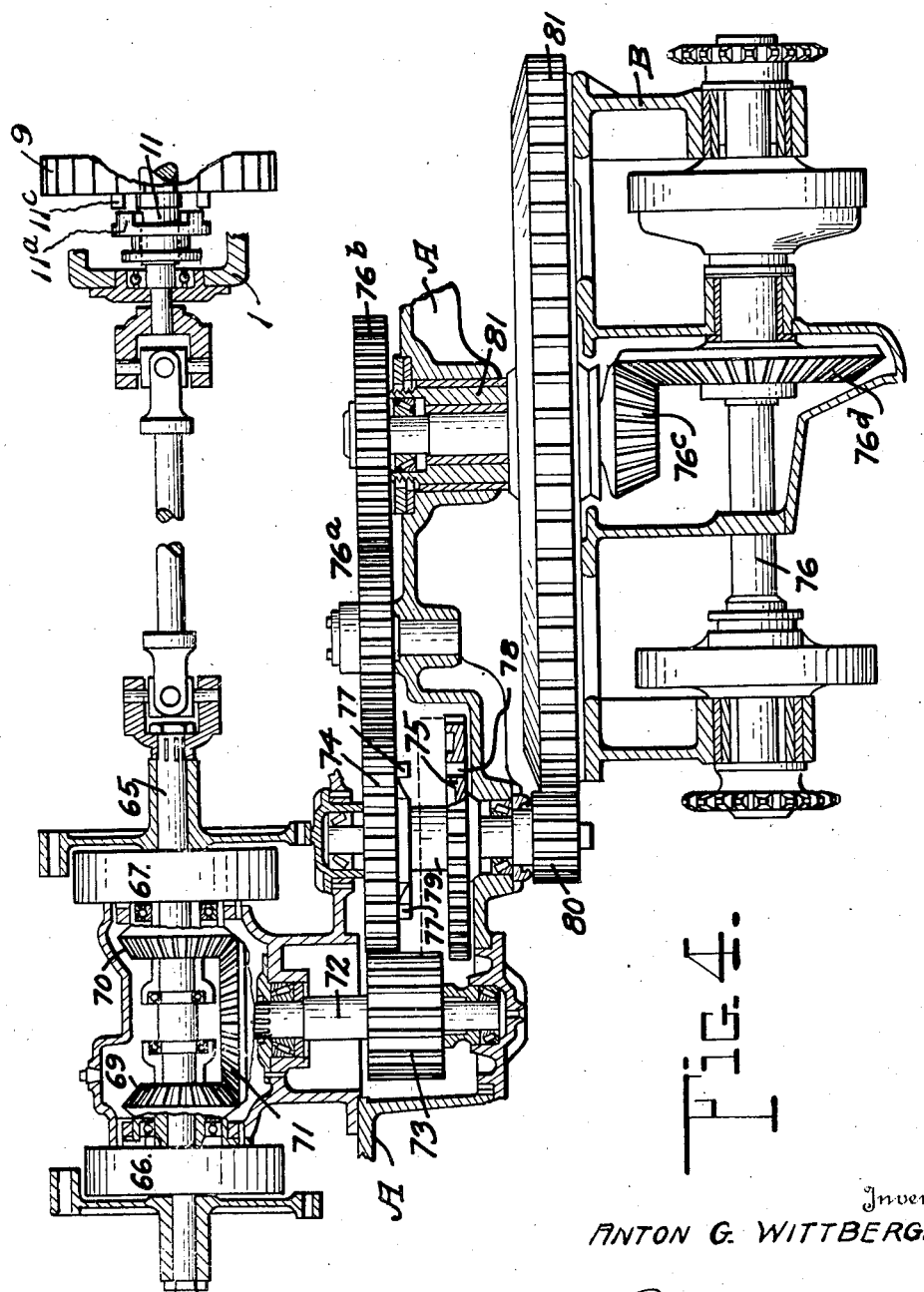
Fig. 4 is a somewhat diagrammatic vertical sectional view disclosing the mechanism for obtaining the drive from the power take-off shaft to the combined swing and traction mechanism.

The swing and traction mechanism, as shown in Figs. 4 and 5, includes a shaft 65 which is connected to and rotatable with the swing and traction shaft 11 carried by the unitary housing 1. This shaft 65 is provided with two clutch members 66 and 67 which may be alternately engaged to cause rotation of one or the other of the bevel pinions 69 and 70. The pinions 69 and 70 mesh with a bevel pinion 71 secured to the vertical shaft 72 journaled on the carbody frame of the machine. The shaft 72 carries at the other end thereof a driving pinion 73 which meshes with a gear 74 loose on a sleeved pinion 75. The gear 74 is arranged for vertical adjustment by suitable control levers (not shown) so that when the gear is moved to the upper position, as shown in Figs. 4 and 5, rotation of the swing and traction shaft 11 with one or the other of the clutches 66 and 67 engaged, will transmit power to the traction shaft 76 through the intermediate gears 76a, 76b, 76c and 76d. When, however, it is desired to swing the carbody, then under these conditions, the shiftable gear 74 is lowered to cause the same to move to the dotted line position, as shown in Figs. 4 and 5, and the meshing relation of the gear 74 with the gear 76a constituting a part of the drive to the traction devices is discontinued. The gear 74 has provided on its lower face jaw clutch members 77 which engage corresponding openings in the sleeved gear or clutch member 78 when the gear 74 is lowered into the position as shown. The engagement of these clutch members will establish the drive from the pinion 73 through the gear 74 directly to the sleeved clutch member 78 which is keyed to the swing shaft 79.

The swing shaft has also keyed thereon the pinion 80 meshing with the ring gear 81 on the base of the machine. It will, therefore, be observed that rotation of the shaft 72 will cause the pinion 80 to be rotated and thereby swing the carbody around its pivotal center 81' on the traction base, while if the gear 74 is raised to the full line position, the clutch engagement just mentioned will be broken and driving relation established from the shaft 72 to the traction devices which are driven by the shaft 76 and depending upon which way the shaft 72 is rotating, the excavator will be moved.

Referring to Figs. 2 and 3, it will be observed that with the clutches 9b, 10b, 11a and 11b in disengaged position, or the position as shown in these figures of the drawings, no driving relation is established either between the swing and traction shaft 11 or to the excavating mechanism through the gear 13. Shifting of the clutch 9b into engagement with the clutch 9c establishes a high speed driving relation from the power shaft 4 or driving shaft 6 to the pinion 13 for operating the hoist drums of the excavator. The clutch 11a is now engaged with the clutch 11c on the gear 9 and high speed driving relation will also be established to the swing and traction shaft 11. If on the other hand the clutch 11b is engaged with the jaw clutch 11d on the gear 10, then under these conditions, low speed driving relation will be established between the drive shaft 6 and the swing and traction mechanism, as shown in Figs. 4 and 5 of the drawings, while at the same time, if the clutch member 9b remains in engagement with the jaw clutch 9c of the pinion 12, high speed driving relation will be maintained with respect to the hoisting drums. If either of the clutches 9b or 10b remain disengaged when one or the other of the clutches 11a or 11b is engaged, it should be observed that the pinion 12 will remain stationary, thereby materially reducing wear and tear on the excavating parts of the machine while the swing or traction mechanism is under these conditions being operated. On the other hand, if the clutch members 11a and 11b remain disengaged while either of the clutch members 9b and 10b is engaged to operate the hoisting drums of the excavator, the swing and traction shaft, as well as the swing and traction mechanism, will remain in a state of rest, thereby materially increasing the life of these parts of the machine.

The gearing and shafts of the two-speed drive to the hoisting drums and the swing and traction mechanism are suitably journaled on anti-friction bearings entirely within the casing 1 and the cover 2, and as disclosed in my co-pending application, may be adequately lubricated and rendered comparatively noiseless, as well as obviating the menace of exposed gears to the operators or workmen on the machine.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In an excavator crane, a traction base, a car body carried thereby, an excavating mechanism associated with the car body, a drive shaft having secured thereto a plurality of gears of different diameters, a second shaft for driving said traction base, having loosely journaled thereon a plurality of gears of different diameters, being in meshing relation with certain of the gears of the drive shaft, clutch means on said shaft for establishing driving relation between the last mentioned gears on the second shaft and another gear loose on the second shaft, said last mentioned gear constituting driving means for said excavating mechanism, and additional clutch means on said shaft for selectively establishing driving relation between certain of the gears on the second shaft and the shaft itself.

2. In an excavating crane including a traction base, a car body carried thereby, an excavating mechanism operatively associated with said body, a drive shaft, a pair of spaced driving gears thereon, a second parallel power take-off shaft for operating said traction base, a pair of spaced gears freely journaled thereon in meshing relation with the said driving gears on the drive shaft, a third gear freely journaled on the power take-off shaft intermediate the last mentioned gears, means for selectively establishing a driving relation between either of the last said gears and the third gear and between either of said gears and the shaft, and means for operating said excavating mechanism arranged to be driven by the third gear.

3. In an excavating crane including a traction base, a car body carried thereby, an excavating mechanism carried by said body, a drive shaft, a pair of spaced driving gears thereon, a second shaft for operating said traction base, a pair of spaced gears loosely journaled thereon in meshing relation with the first mentioned gears, a third gear loose on said shaft arranged to be driven by either of the other gears, clutch means for establishing a driving relation between either of the spaced gears on the second shaft and the third gear and between either of the last mentioned gears and the second shaft, and means for taking off power from the second shaft to operate said traction base and from the third gear to operate said excavating mechanism.

4. In an excavating crane, including a traction base, a car body rotatably carried thereby, and an excavating device carried by the said car body, a drive shaft, a pair of spaced driving gears of different diameters secured thereto, a second shaft spaced from the drive shaft, a pair of gears of different diameters freely journaled on the second shaft and disposed in meshing relation with the said driving gears, a third gear freely journaled on the second shaft, means for selectively establishing driving relation between either of the gears on the second shaft and the third gear for obtaining a differential driving relation between the first shaft and the third gear, a second means selectively establishing a driving relation between the gears on the second shaft and the shaft itself in order to obtain a differential driving speed relation between the drive shaft and the second shaft, means for operating the excavating device of the excavating crane adapted to be driven by said third gear, and means for selectively operating the said traction base and for rotating the said car body by the said second shaft.

5. In an excavating crane, a traction base and supporting framework carried thereby including a hoisting drum, a drive shaft carried by said framework, a pair of high and low speed driving gears on said shaft, a second shaft supported by the framework and having loosely journalled thereon corresponding high and low speed gears in meshing relation with the first mentioned driving gears to be driven thereby, means for operating the traction base from said second shaft, means for selectively establishing a driving relation between the high and low speed gears on the second shaft and the shaft itself, a third gear loosely journalled on the second shaft for operating the hoisting drum, and means for selectively establishing a driving relation between either the high or low speed gears on said second shaft and the third gear.

6. In crane operating mechanism, an engine driven shaft, a driving shaft adapted to be driven by said engine shaft, high and low speed gears carried by said shaft, a second shaft, high and low speed gears carried by said second shaft in meshing relation with the aforementioned high and low gears, a third gear carried by said second shaft, clutch means for establishing driving relation between said third gear and said high speed gear on said second shaft, separate clutch means for establishing driving relation between said third gear and said low speed gear on said second shaft, clutch means for establishing driving relation between said high speed gear and said second shaft, clutch means for establishing driving relation between said low speed gear and said second shaft, and an excavating mechanism adapted to be driven by said third gear.

7. In crane operating mechanism, an engine driven shaft, a driving shaft adapted to be driven by said engine shaft, high and low speed gears carried by said shaft, a second shaft, high and low speed gears carried by said second shaft in meshing relation with the aforementioned high and low speed gears, a third gear carried by said second shaft, clutch means for establishing driving relation between said third gear and said high speed gear on said second shaft, separate clutch means for establishing driving relation between said third gear and said low speed gear on said second shaft, clutch means for establishing driving relation between said high speed gear and said second shaft, clutch means for establishing driving relation between said low speed gear and said second shaft, an excavating mechanism adapted to be driven by said third gear, and a swing and traction mechanism adapted to be operated by said second shaft.

8. In an excavator operating mechanism of the class described, a driving gear, a shaft, a plurality of gears on said shaft of different diameters, gearing between said driving gear and certain of the gears on said shaft for driving said last mentioned gears at different speeds, separate clutch means for establishing driving relation between these gears and said shaft to drive the shaft at different speeds, a swing and traction mechanism driven by said shaft, an excavating mechanism arranged to be driven by one or the other of said last mentioned gears independently of said shaft, and separate clutch mechanisms between said gears and said excavating mechanism to drive the excavating mechanism at different speeds.

9. In an excavating machine of the class described, a traction base, a carbody rotatably mounted thereon, an excavating mechanism carried by said carbody, a driving gear, a swing and traction shaft constituting a drive to the traction base or to the carbody swinging mechanism, a pair of spaced gears loosely carried by said traction shaft, gearing between said driving gear and the last mentioned gears for driving said gears at different speeds, a third gear loosely carried by said swing and traction shaft and adapted to drive said excavating mechanism, independent clutch means on the shaft for establishing driving relation between said gears on said traction shaft and said shaft to drive the shaft at speeds corresponding to the speeds of the spaced gears on the swing and traction shaft, and additional separate clutch means on the shaft for clutching the said third gear to either of the spaced gears to drive said third gear at speeds corresponding to the speeds of the spaced gears and to drive the excavating mechanism at different speeds, said clutches being independently shiftable to discontinue the drive to the swing and traction shaft or to the excavating mechanism or both.

10. In apparatus of the class described, including a traction base, a car body swingably carried thereby, excavating mechanism carried by said car body, and a power source on said car body, means for driving said traction base including a traction gear train adapted to be driven from said power source, means for swinging said car body on said traction base to dispose said excavating mechanism in the desired position, said means being adapted to be driven from said power source, means for actuating said excavating mechanism including a gear train adapted to be driven from said power source, speed change mechanism common to said traction gear train, swing means, and excavating gear train, and interposed intermediate the same and the said power source, and means for controlling from the common speed change mechanism the speed of actuation of the traction gear train and swing means independently of the excavating gear train.

11. In apparatus of the class described, including a traction base, a car body swingably carried thereby, excavating mechanism carried by said car body, and a power source on said car body, means for driving said traction base including a traction gear train adapted to be driven from said power source, means for swinging said car body on said traction base to dispose said excavating mechanism in the desired position, said means being adapted to be driven from said power source, means for actuating said excavating mechanism including a gear train adapted to be driven from said power source, a speed change unit common to said traction gear train, swing means, and excavating gear train, and interposed intermediate the same and the said power source, power take-off mechnisms connecting said speed change unit with said traction gear train, swing means, and excavating gear train, and means for controlling from the common speed change mechanism the speed of actuation and the operation of the traction gear train and swing means independently of the excavating gear train whereby certain of said power take-off mechanisms may be actuated by said speed change unit at relatively different speeds while others of said power take-off mechanisms remain stationary.

ANTON G. WITTBERGER.